US009319461B2

(12) United States Patent
Perkuhn et al.

(10) Patent No.: US 9,319,461 B2

(45) Date of Patent: Apr. 19, 2016

(54) INDIVIDUALIZED DATA COMMUNICATION ON THE BASIS OF A DESCRIPTIVE FILE

(75) Inventors: Heiko Perkuhn, Aachen (DE); Ibtissam El Khayat, Glons (BE); Pierre Lepropre, Bastogne (BE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 121 days.

(21) Appl. No.: 13/509,927

(22) PCT Filed: Feb. 5, 2010

(86) PCT No.: PCT/EP2010/051445

§ 371 (c)(1), (2), (4) Date: Jul. 9, 2012

(87) PCT Pub. No.: WO2011/063995

PCT Pub. Date: Jun. 3, 2011

(65) Prior Publication Data

US 2013/0042016 A1 Feb. 14, 2013

Related U.S. Application Data

(60) Provisional application No. 61/264,342, filed on Nov. 25, 2009.

(51) Int. Cl.

*G06F 15/16* (2006.01)
*H04L 29/08* (2006.01)

(52) U.S. Cl.

CPC .............. *H04L 67/104* (2013.01); *H04L 67/02* (2013.01); *H04L 67/108* (2013.01); *H04L 67/1063* (2013.01)

(58) Field of Classification Search

None

See application file for complete search history.

(56) References Cited

U.S. PATENT DOCUMENTS 6,930,598 B2 8/2005 Weiss
7,734,600 B1 6/2010 Wise et al.
8,099,476 B2 * 1/2012 Biderman et al. ............ 709/219

(Continued)

FOREIGN PATENT DOCUMENTS

EP 2148488 A1 1/2010

OTHER PUBLICATIONS

Blackburn, Jeremy, and Ken Christensen. "A simulation study of a new green bittorrent." Communications Workshops, 2009. ICC Workshops 2009. IEEE International Conference on. IEEE,2009.*

(Continued)

*Primary Examiner* — Chris Parry

*Assistant Examiner* — Caroline Jahnige

(74) *Attorney, Agent, or Firm* — Coats & Bennett, PLLC

(57) ABSTRACT

For individualized data communication of a data entity (200) to at least a first recipient and a second recipient, a descriptive file (100) is provided, which is supplemented by at least one identifier of a placeholder type. The descriptive file (100) also includes at least one identifier of a direct type, which is associated with a corresponding data piece (210) of the data entity (200). The identifier of the placeholder type is in turn associated with descriptive data (120) of an individualized data piece (220). By providing different types of the descriptive data (120) for different recipients, the identifier of the placeholder type may be used as a reference to different types of personalized content in the individualized data piece (220). This individualization may be obtained without modifying an identifier section (110) of the descriptive file (100).

20 Claims, 12 Drawing Sheets

(56) References Cited

U.S. PATENT DOCUMENTS

| | | | | |
|---|---|---|---|---|
| 2003/0149975 | A1 | 8/2003 | Eldering et al. | |
| 2004/0044727 | A1* | 3/2004 | Abdelaziz et al. | 709/203 |
| 2004/0107169 | A1* | 6/2004 | Lowe | 705/59 |
| 2004/0156366 | A1 | 8/2004 | Walls et al. | |
| 2004/0163101 | A1 | 8/2004 | Swix et al. | |
| 2005/0183120 | A1* | 8/2005 | Jain et al. | 725/46 |
| 2006/0064383 | A1 | 3/2006 | Marking | |
| 2006/0190358 | A1* | 8/2006 | Slik | 705/27 |
| 2007/0183342 | A1 | 8/2007 | Wong et al. | |
| 2008/0005114 | A1* | 1/2008 | Li | 707/9 |
| 2008/0256243 | A1 | 10/2008 | White | |
| 2008/0271068 | A1* | 10/2008 | Ou et al. | 725/32 |
| 2009/0005090 | A1 | 1/2009 | Hong et al. | |
| 2009/0089401 | A1 | 4/2009 | Zhang et al. | |
| 2009/0106104 | A1 | 4/2009 | Upendran et al. | |
| 2010/0299687 | A1* | 11/2010 | Bertino-Clarke | 725/5 |
| 2010/0322213 | A1 | 12/2010 | Liu et al. | |
| 2011/0078125 | A1* | 3/2011 | Perkuhn et al. | 707/694 |
| 2011/0125849 | A1 | 5/2011 | Boyd et al. | |
| 2012/0297410 | A1* | 11/2012 | Lohmar et al. | 725/14 |
| 2013/0246352 | A1* | 9/2013 | Spurlock et al. | 707/615 |

OTHER PUBLICATIONS

Johansen, Dag, et al. "DAVVI: A prototype for the next generation multimedia entertainment platform." Proceedings of the 17th ACM international conference on Multimedia. ACM,2009.*

Web, Semantic. "W3C." URL:http://www.w3.org/2001/sw (2009).*

Pantos, Roger. "Apple Inc."HTTP Live Streaming. draft-pantos-http-livestreaming-08(Informational)(Mar. 2012)(2009).*

Blackburn, Jeremy, and Ken Christensen. "A simulation study of a new green bittorrent." Communications Workshops, 2009. ICC Workshops 2009. IEEE International Conference on. IEEE, 2009.*

Annonymous, "How to make encrypted links?", Webdeveloper.com forum, Jul. 7, 2005, pp. 1-4, [retrieved on Jul. 24, 2013], retrieved from Internet: http://www.webdeveloper.com/forum/showthread.php?153688-How-to-make-encrypted-links.

Vidal, C., "Facebook einrichten, Teillll: Link auf das eigene Facebook-Profil", May 19, 2009, pp. 1-4, XP055062060, [retrieved on Jul. 26, 2013] retrieved from the Internet: http://onsoftware.softonic.de/facebook-einrichten-teil-iii-link-auf-das-eigene-facebook-profil.

Communication pursuant to Article 94(3) EPC re Application No. 10703453.0, May 14, 2013, pp. 1-2, Annexes pp. 1-4.

McFedries, P., "Here is the image you requested (see the explanation, below):", webpage, archived, Jun. 16, 2002, p. 1, retrieved on Sep. 16, 2014, retrieved from internet: http://web.archive.org/web/20020616125103/http://www.mcfedries.com/JavaScript/boilerplate2.asp.

Cohen, B. "The BitTorrent Protocol Specification." Feb. 28, 2008, pp. 1-9, [retrieved on Jul. 16, 2009]. Retrieved from the Internet: <URL: http://www.bittorrent.org/beps/bep_0003.htm>.

Shen, Y. et al. "Peer-Driven Video Streaming: Multiple Descriptions Versus Layering." Jul. 2005, pp. 1-13, [retrieved on Jun. 2, 2010]. Retrieved from the Internet: <URL: http://cis.poly.edu/{ross/papers/p2pvideo_July05.pdf>.

Lee, T.-C. et al. "Live Video Streaming Using P2P and SVC." Management of Converged Multimedia Networks and Services (lecture notes in Computer Science), Sep. 22, 2008, pp. 104-113, Springer Berlin Heidelberg, Heidelberg, Berlin.

Theory.org Wiki "BitTorrentSpecification." Bittorrent Protocol Specification v1.0, last modified Sep. 26, 2014, pp. 1-5 <https://wiki.theory.org/BitTorrentSpecification>.

Website link <http://www.hulu.com/>, accessed on Oct. 8, 2014, pp. 1-6.

Website link <http://www.bittorrent.com >, accessed on Oct. 8, 2014, pp. 1-4.

Author Unknown. "Here is the image you requested (see the explanation below)" Published Jun. 16, 2002, Retrieved from the internet Sep. 4, 2014, XP055113023 <http:///www.mcfedries.com/JavaScript/boilerplate2.asp>.

Cohen, B. "The BitTorrent Protocol Specification." BitTorrent.org, version f61df4010379f5c40090a9b77b73e57db7045dee, created Jan. 10, 2008, pp. 1-6 <http://www.bittorrent.org/beps/bep_0003.html>.

GTK-Gnutella Development, "Chapter 4. Searching for files", Manual; XP055211863; Retrieved from the Internet: URL: https://web.archive.org/web/20070515105112/http://gtk-gnutella.sourceforge.net/manual/searching.html; [retrieved on Nov. 6, 2015]; May 15, 2007; pp. 1-2.

* cited by examiner

.
.
.
INFO

| | |
|---|---|
| LENGTH: | XXXXX |
| NAME: | YYYYY |
| PIECE LENGTH: | ZZZZ |
| PIECES: | SHA1(P1)SHA(P2)...SHA1(B)...SHA(P10) |

.
.
.
INFO

| | |
|---|---|
| LENGTH: | XXXXX |
| NAME: | YYYYY |
| PIECE LENGTH: | ZZZZ |
| PIECES: | SHA1(P1)SHA(P2)...SHA1(G)...SHA(P10) |

.
.
.
INFO

| | |
|---|---|
| LENGTH: | XXXXX |
| NAME: | YYYYY |
| PIECE LENGTH: | ZZZZ |
| PIECES: | SHA1(P1)SHA(P1)...PH...SHA(P10) |

INDIVIDUALIZED DATA COMMUNICATION ON THE BASIS OF A DESCRIPTIVE FILE

TECHNICAL FIELD

The present invention relates to techniques for individualized communication of data on the basis of a descriptive file.

BACKGROUND

Digital distribution of data, e.g. multimedia content, has been gaining more and more attention over the recent years. In this respect, it is known to distribute data on the basis of a descriptive file, also referred to as a metafile. Examples of such descriptive files are, e.g. a torrent file as used according to the BitTorrent protocol and a playlist file as used according to the HTTP Live streaming protocol. Typically, a recipient of the data will use information in the descriptive file as a basis for obtaining the data. Such information may be identifiers uniquely associated with pieces of the data to be received. Actual reception of the data may then occur from different sources, e.g. according to a peer-to-peer (P2P) protocol. One example of a P2P protocol is the above-mentioned BitTorrent protocol.

In P2P protocols, content is shared among all users that are part of a P2P network. For this purpose, a descriptive file exists for every content item available in the network. In this respect, "available" means that at least one member of the network, also referred to as a "peer", is offering this content item. In the descriptive file, small pieces of the content item are addressed. When a user requests a certain content item, these pieces may be served from different members of the network. This has the advantage that the recipient of the content item does not have to rely on certain peers providing the pieces to be online the whole time until the content item is received completely. Every piece may be served from the most suitable location, e.g. from a location to which there is a data connection with low latency and high bit rate.

According to known P2P techniques, the descriptive file of a content item contains hash values of the different pieces. The individual hash values of the different pieces are used to identify the pieces upon reception. Further, the descriptive file includes a hash value obtained on the basis of these individual hash values. The latter hash value may be used as a signature to uniquely identify the content item and to verify the integrity of the descriptive file. Hence, when modifying one piece of the content item, the corresponding individual hash value and also the hash value computed on the basis of the individual hash values will change. Accordingly, even though only one piece of the content item has been modified, the hash value computed from the individual hash values will be interpreted as referring to a different content item. For example, a content item in the form of a movie with advertisements for young boys would have a different signature than the same movie with advertisements for middle-aged women. The consequences are that each individualized version of the movie would be considered as totally distinct content which needs a distinct storage. In other words, even the pieces of the content item which are the same in both individualized versions would need to be provided separately.

Accordingly, there is a need for techniques which allow for efficiently communicating individualized data to different recipients.

SUMMARY

According to an embodiment of the invention, a method of communicating a data entity to at least a first recipient and a second recipient on the basis of a descriptive file is provided. The descriptive file comprises at least one identifier of a direct type associated with a corresponding data piece of the data entity. The method includes a step of adding an identifier of a place holder type to the descriptive file. The identifier of the placeholder type is associated with descriptive data of an individualized data piece. A first type of the descriptive data is provided for the first recipient, and a second type of descriptive data is provided for the second recipient. The first type of the descriptive data is different from the second type of the descriptive data.

According to a further embodiment of the invention, a method of communicating a data entity to at least a first recipient and a second recipient on the basis of a descriptive file is provided. The descriptive file comprises at least one identifier of a direct type associated with a corresponding data piece of the data entity and an identifier of a placeholder type associated with descriptive data of an individualized data piece. The method includes steps of providing a first type of the descriptive data for the first recipient and providing a second type of the descriptive data for the second recipient. The first type of the descriptive data is different from the second type of the descriptive data.

According to a further embodiment of the invention, a method of communicating a data entity to on the basis of a descriptive file is provided. The descriptive file comprises at least one identifier. The identifier can be either of a direct type associated with a corresponding data piece of the data entity or of a placeholder type associated with descriptive data of an individualized data piece. The method further includes a step of, if the identifier is of the placeholder type, retrieving the associated descriptive data of the individualized data piece and a step of retrieving the individualized data piece on the basis of the retrieved descriptive data.

According to a further embodiment of the invention, a device is provided. The device includes an individualization logic configured to accomplish the above-mentioned step of adding the identifier of the placeholder type to a descriptive file and/or configured to accomplish the above-mentioned steps of providing a first type of the descriptive data for the first recipient and providing a second type of the descriptive data for the second recipient.

According to a further embodiment of the invention, a device is provided. The device includes a placeholder logic configured to accomplish steps of the above-mentioned method of receiving data.

BRIEF DESCRIPTION OF THE DRAWINGS

FIGS. 9A and 9B illustrate examples of descriptive files.

FIG. 10 illustrates an example of a descriptive file according to an embodiment of the invention.

DETAILED DESCRIPTION

In the following, the invention will be explained in more detail by referring to exemplary embodiments and to the accompanying drawings. The illustrated embodiments relate to techniques for individualized communication of a data entity to different recipients. The data entity may include different types of content. For example, the data entity may include multimedia content which is individualized by advertisements or extra scenes, e.g. censored scenes or scenes of an extended version of the multimedia content. According to another example, the data entity may include software which includes individualized modules, e.g. different language modules. The techniques as described herein may be applied in various types of communication networks, e.g. in a mobile communication network according to the 3GPP (Third Generation Partnership Project) technical specifications. The techniques may also be applied in wired networks, e.g. by internet providers. The following description will more or less focus on the example of using the BitTorrent protocol, as one example of a P2P protocol, for communicating the data. However, it is to be understood that the concepts as described herein may also be applied with other communication protocols, e.g. the HTTP Live Streaming protocol, as one example of a streaming protocol which is based on a descriptive file.

Figure 1:
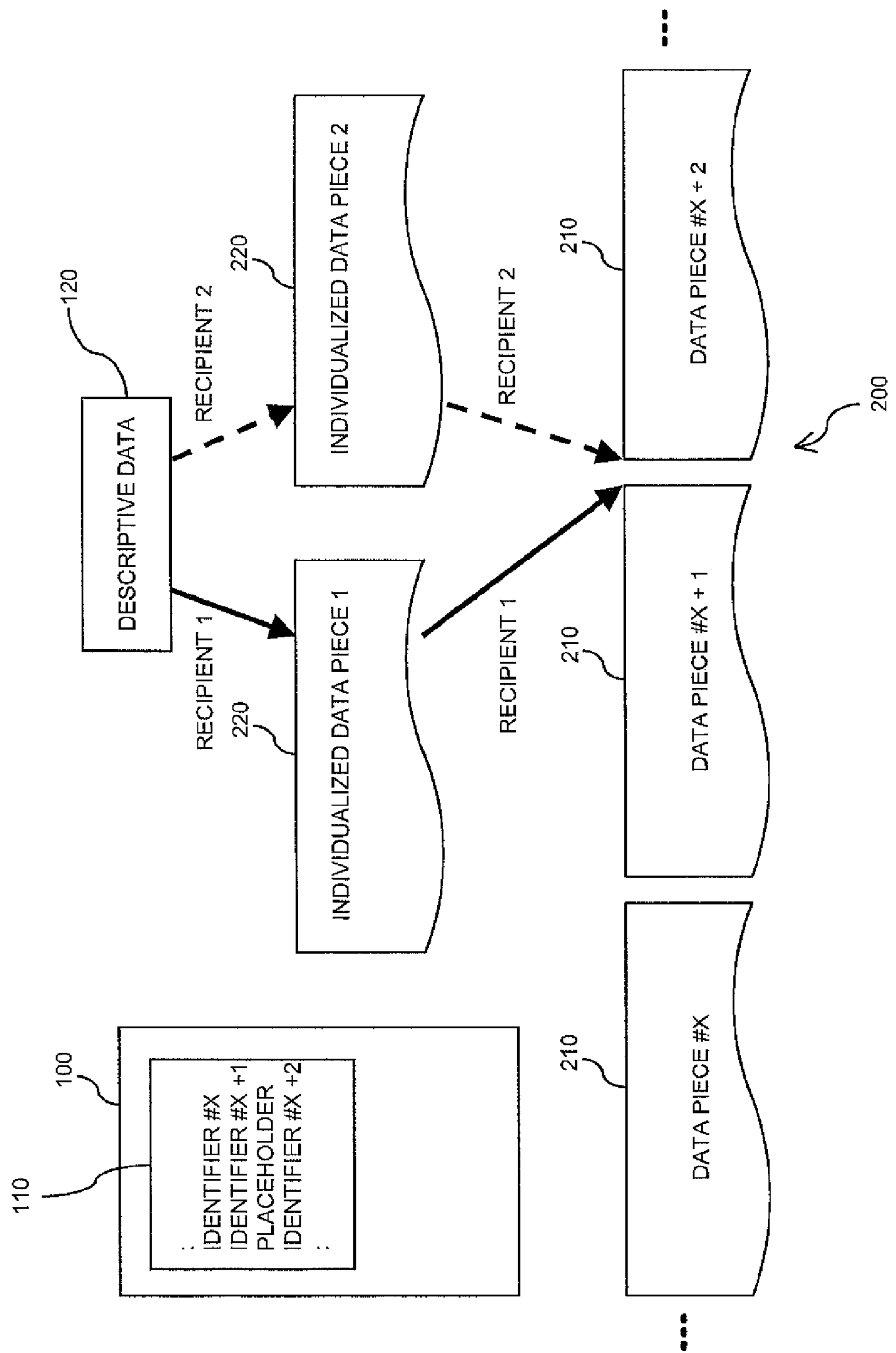
FIG. 1 schematically illustrates the structure of a data entity, which is provided with an individualized data piece, and a descriptive file of the data entity as used to an embodiment of the invention.

FIG. 1 schematically illustrates the structure of a data entity 200 which is individualized according to an embodiment of the invention. Further, FIG. 1 also schematically illustrates the structure of a descriptive file 100 as used in an embodiment of the invention.

As illustrated, the data entity 200 is subdivided into a plurality of data pieces 210. The data pieces 210 may be joined together in a given order so as to form the data entity 200. For example, if the data entity 200 includes multimedia content, e.g. audio data and/or video data, then the data pieces 210 may be arranged in the order in which the multimedia content is intended to be played out. According to an embodiment, the data pieces 210 may be pieces of a media file, or may be individual media files. In FIG. 1, the ordering of the data pieces 210 is indicated by numbers #X, #X+1, #X+2. In accordance with this given order, the data pieces 210 will be joined together to form the data entity 200 by placing the data piece 210 with the number #X+1 after the data piece 210 with the number #X, and by placing the data piece 210 segment with the number #X+2 after the data piece 210 with the number #X+1.

As further illustrated in FIG. 1, the data entity 200 is individualized by providing an individualized data piece 220, which is to be included in the data entity 200 as received by different recipients. A first type of the individualized data piece 220 is provided for a first recipient (recipient 1), and a second type of the individualized data piece 220 is provided for a second recipient (recipient 2). In this respect, it is to be understood that the first recipient and the second recipient may correspond to different clients receiving the data, e.g. in physically distinct recipient devices. However, the first and second recipient may also correspond to the same client, but at different points of time. The first and second types of the individualized data piece 220 have different content. Accordingly, the data entity 200 which is received by the first recipient and the second recipient may be individualized by including a respective type of the individualized data piece 220. In this respect, it is to be understood that it is also possible to provide more than two different types of the individualized data piece 220 so as to obtain individualization with respect to more than two recipients. Further, the data entity 200 may include more than one individualized data piece. Also, it is to be understood that the first and the second recipient may each be representative of a group of recipients which is intended to receive the same type of individualized content. Moreover, the individualized data piece 220 may be inserted between the data pieces 210 of the data entity 200 at a given position or may replace a given one of the data pieces 210.

The descriptive file 100 is provided for the purpose of allowing the client to control the reception of the data pieces 210. For this purpose, the descriptive file 100 includes an identifier section 110. The identifier section 110 includes a corresponding identifier for each of the data pieces 210 of the data entity 200. In the illustrated example, the identifier with number #X corresponds to the data piece 210 with the number #X, the identifier with the number #X+1 corresponds to the data piece 210 with the number #X+1, and the identifier with the number #X+2 corresponds to the data piece 210 with the number #X+2. These identifiers may be used to directly identify the data pieces 210. In other words, there is a one-to-one relation between the data pieces 210 and their corresponding identifiers. These identifiers may therefore also be referred to as identifiers of a direct type.

As further illustrated, the identifier section 110 of the descriptive file 100 includes a further identifier (designated with "PLACEHOLDER") which is of a placeholder type. The identifier of the placeholder type is associated with descriptive data 120 of the individualized data piece 220. The descriptive data 120 may be of a first type or of a second type. The first type of the descriptive data 120 corresponds to the first recipient and refers to the first type of the individualized data piece 220 provided for the first recipient. The second type of the descriptive data 120 corresponds to the second recipient and refers to the second type of the individualized data piece 220. Again, it is to be understood that for obtaining individualization with respect to further recipients, further types of the descriptive data 120 may be provided. As compared to the identifiers of the direct type, which have a one-to-one relation to the data pieces 210, the identifier of the placeholder type refers to the descriptive data 120, which may be of different types. Accordingly, the identifier of the placeholder type allows for identifying different types of the individualized data piece depending on the specific recipient receiving the data entity 200. However, the identifier section 110 of the descriptive file 100 is left unchanged by this individualization.

According to an embodiment, the identifiers of the direct type may be signatures of the corresponding data pieces 210, e.g. hash values. For example, if the data communication is based on the BitTorrent protocol, the descriptive file 100 may be a torrent file according to the BitTorrent protocol, and the identifier section 110 may be the "info" section of the torrent file. In this scenario, the identifiers of the direct type may each be a hash value of the corresponding data piece 210, e.g. hash values computed according to the Secure Hash Algorithm 1 (SHA 1). In another scenario, the data communication may be based on a file streaming protocol, e.g. the HTTP Live Streaming protocol. In this scenario, the descriptive file 100 may be a playlist file according to the HTTP Live Streaming protocol and the identifier section 110 may be a list of Uniform Resource Identifiers (URIs).

The identifier of the placeholder type may be associated with the descriptive data 120 by storing the descriptive data 120 at a predefined location. For example, the descriptive data 120 may be stored at a predefined location within the descriptive file 100, but outside the identifier section 110. According to other examples, other predefined locations may be used, e.g. an additional file, a predefined network location, e.g. identified by a Uniform Resource Locator, a predefined memory location within the recipient device, or the like.

The identifier of the placeholder type may have the same format as the identifiers of the direct type. For example, if the identifiers of the direct type are hash values of a given length, e.g. 20 byte, then the identifier of the placeholder type may be a value of the same length. According to an example, the identifier of the placeholder type may be computed as a dummy signature, e.g. the SHA1 hash value of the phrase "ericsson ads P2P solution" which is [4d622cad7ba532e8defe3d60e2bf75a2e2f369c]. According to a further example, the identifier of the placeholder type may be a dummy delivery source identifier, e.g. a dummy URI in which a certain part, e.g. the scheme part indicates the dummy character of the identifier, e.g. by including an indicator "dummy" or the like. The descriptive data 120 associated with the identifier of the placeholder type may in turn include an identifier of the direct type having a one-to-one relation to the specific type of the individualized data piece 220 which corresponds to the intended recipient. For example, the descriptive data 120 may include the signature of the specific type of the individualized data piece 220. According to another example, the descriptive data 120 may include the URI of the specific type of the individualized data piece 220. The descriptive data 120 may also provide supplemental information about the specific type of the individualized data piece 220, e.g. the size of the specific type of the individualized data piece 220. According to an embodiment, including the size in the descriptive data 120 may be used to provide support of arbitrary sizes of data pieces in a protocol using otherwise uniform sizes of the data pieces 210, e.g. in the BitTorrent protocol.

According to the concepts as explained above, a solution is provided for the problem of uniquely identifying a content item, i.e. the data entity 200, regardless of any added individual parts, e.g. the individualized data piece 220. This is achieved by using a descriptive file, e.g. the descriptive file 100, which includes the identifiers of the direct type, which have a one-to-one relation to the data pieces 210 of the data entity 200, and at least one identifier of the placeholder type, which may be included in the descriptive file 100 at a position corresponding to the individualized content. In a P2P scenario, e.g. on the basis of the BitTorrent protocol, the identifiers of the direct type will be hashes of the data pieces 210 of the main content, i.e. of the data entity 200, and the identifiers of the placeholder type are provided where the individualized parts are supposed to be. Accordingly, the part of the descriptive file which includes the identifiers of the direct type and the identifier or identifiers of the placeholder type will have the same signature. The descriptive file, which may be a torrent file according to the BitTorrent protocol, which has been individualized in the above-mentioned manner, i.e. by introducing at least one identifier of the placeholder type, is then sent out to the user or recipient. The user or recipient can then fetch the data pieces 210 forming the main content, i.e. the data entity 200, and only that specific type of the at least one individualized data piece 220 which corresponds to this recipient. For example, in a scenario in which the main content is multimedia content and the at least one individualized data piece 220 corresponds to one or more advertisements, information with respect to the specific type of the at least one individualized data piece 220 may be included in the descriptive data 120, which may be placed in the descriptive file 100, e.g. in the torrent file according to the BitTorrent protocol. Accordingly, the user can fetch only those advertisements which are described in the descriptive file or torrent file.

According to some embodiments, it is also possible that the identifier of the placeholder type is used at different positions in the descriptive file 100 as a reference to different individualized data pieces 220. The specific type of the individualized data piece 220 to be fetched can then be dependent on the position of the identifier of the placeholder type in the descriptive file 100. Further, the identifier of the placeholder type may in some cases be used as a reference to one or more of the data pieces 210 of the data entity, i.e. of main content, rather than using the identifier of the direct type to refer to this data piece 210. This data piece 210 may be randomly selected. In a scenario in which the main content is multimedia content, which is individualized by one or more advertisements, occasional usage of the identifier of the placeholder type as reference to a piece of the main content may be used to avoid facilitating skipping of the advertisements.

In the above description, the concepts have been explained as being applicable, e.g., to data communication according to the BitTorrent protocol or according to the HTTP Live Streaming protocol. However, it is to be understood that the concepts may be applied to other types of data communication, e.g. according to other protocols or in connection with other applications, in which a main content is split into smaller atomic pieces, in which a descriptive file describing how the pieces relate to each other is used, and in which the reception or verification of the content is based on a part of the descriptive file, for the purpose of integrating other pieces or contents in the main content. Advertisements to be integrated into a main multimedia content are only one example.

Figure 2:
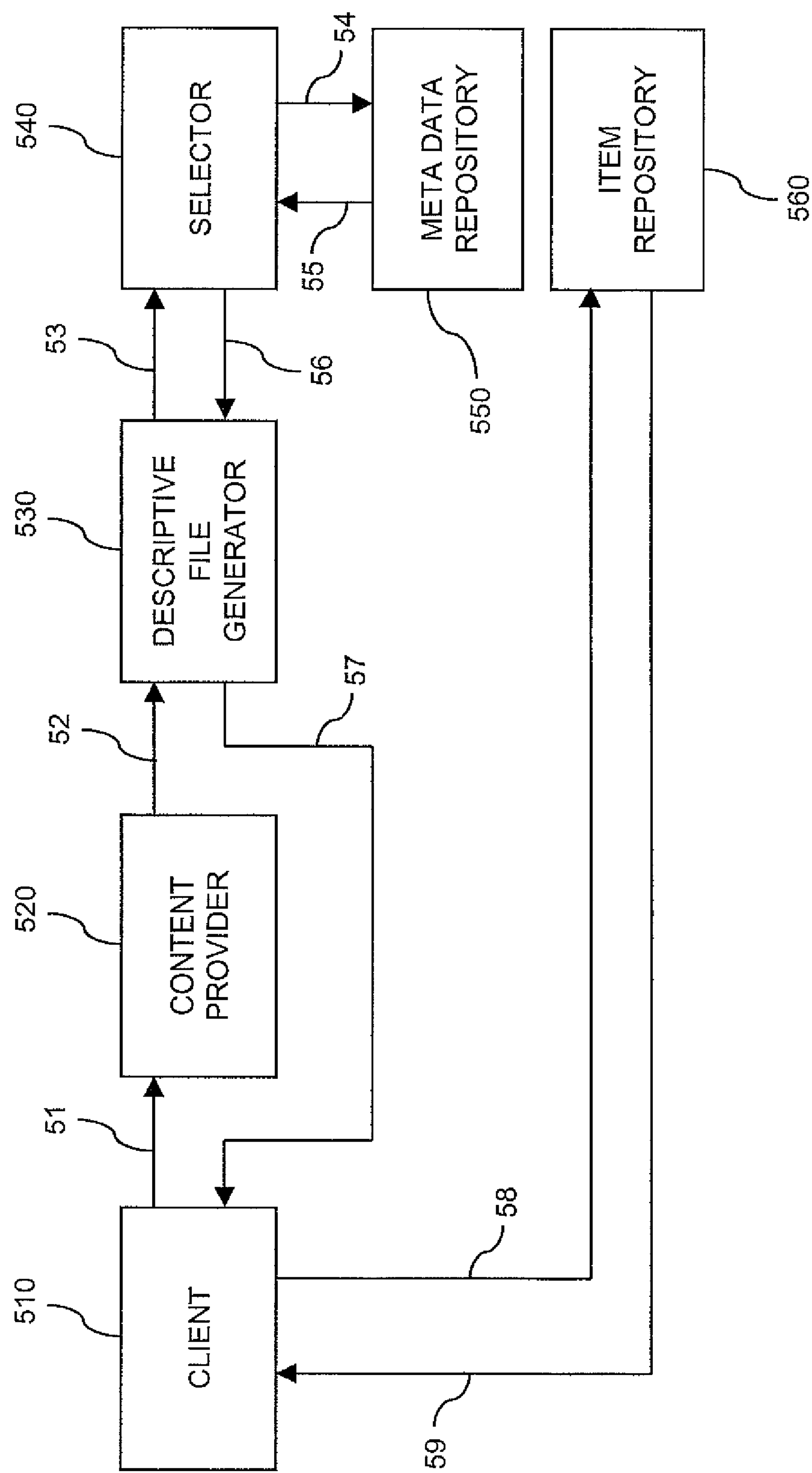
FIG. 2 shows a block diagram for illustrating a system for individualized communication of data according to an embodiment of the invention.

FIG. 2 shows a block diagram for schematically illustrating a system for individualized data communication according to an embodiment of the invention. The system may operate according to the concepts as explained above in connection with FIG. 1. It may be used to communicate any type of data entity, e.g. the data entity 200 as explained in connection with FIG. 1, which is based on data pieces or chunks which are described in a descriptive file, e.g. a meta file, a manifest file, a torrent file, or the like. Each data piece or chunk can be formed of a file, of multiple files, or of a part of a file. The system may be used to communicate a main content with additional personalized content to different recipients. In this respect, personalized content may be represented by individualized data pieces which are not common to all recipients of the same main content. For example, the personalized content may be represented by the at least one individualized data piece 220 as explained in connection with FIG. 1. The descriptive file includes an identifier of a placeholder type, which is used a general reference to the personalized content. In other words, the same identifier of the placeholder type may be used as a reference to different types of the personalized content.

As illustrated, the system includes a client 510, a content provider 520, a descriptive file generator 530, a selector 540, a meta data repository 550, and an item repository 560. These components may be implemented in different types of devices. For example, each of these components may be implemented in a corresponding network device. Further, some of these components could be integrated within the same network device. Further, the client 510 could be implemented within an end user device, e.g. within a terminal to be coupled to a communication network. According to one example, the client 510 may be implemented within a mobile terminal which is configured to be coupled to a mobile communication network, e.g. according to the 3GPP technical specifications.

According to an embodiment of the invention, the operation of the system as illustrated in FIG. 2 may be as follows: The client 510 requests a main content from the content provider 520 by sending a message 51 to the content provider 520. The content provider 520 may then trigger the descriptive file generator 530 to generate the descriptive file by sending a message 52. By sending a message 53, the descriptive file generator 530 requests information with respect to personalized content, e.g. with respect to the individualized data piece 220 as explained in connection with FIG. 1, from the selector 540. By sending a message 54, the selector 540 may request a list of content items to be used as the personalized content from the metadata repository 550. By sending a message 55, the metadata repository 550 responds with a list of available content items. The selector 540 then maps the available content items to different recipients or users. This may be accomplished according to user preferences, user profiles, user interests or other criteria. According to some embodiments, the selector 540 may select one or more identifier of the personalized content, e.g. an identifier of the specific type of the individualized data piece 220 as explained in connection with FIG. 1. The identifier may be a signature, e.g. a hash value, or may be a delivery source identifier, e.g. a URI. Other types of identifiers may be used as well, e.g. a URL. According to some embodiments, the selector may also select and respond with a list of identifiers, e.g. URIs or hash values, which relate to different types of personalized content for the same recipient or the same group of recipients. On the basis of this list, the recipient may then select between different types of the personalized content. By sending a message 56 to the descriptive file generator 530, the selector 540 sends one or more selected identifier of the personalized content to the descriptive file generator 530.

The descriptive file generator generates the descriptive file based on the inputs from the selector 540. The descriptive file is generated so as to include identifiers of the direct type which relate to the main content and at least one identifier of the placeholder type which relates to the personalized content. The identifiers of the direct type and the at least one identifier of the placeholder type may be as explained in connection with FIG. 1. The descriptive file generator 530 provides the descriptive file to the client 510 by sending a message 57.

The client 510 then retrieves the main content and the personalized content on the basis of the descriptive file by sending one or more messages 58 to the item repository 560. In some embodiments, this may also include sending the identifier of the placeholder type. The item repository 560 responds with the items and the personalized content by sending one or more messages 59. Here, it is to be understood that the item repository 560 as illustrated in FIG. 2 may be implemented at a single location or may be distributed over different locations. For example, different data pieces of the main content may be provided from different locations. Further, one or more individualized data piece of the personalized content may be provided from different locations than the main content, and different individualized data pieces may be provided from different locations. When retrieving the content, the client 510 may request, and in the case of multimedia content also play, the personalized content corresponding to the n-th identifier, e.g. the n-th URI or hash value, received from the selector 540 when encountering the n-th identifier of the placeholder type in the descriptive file. If the selector 540 has provided multiple alternative identifiers of the personalized content, the client 510 may select at least one of these alternative identifiers and request the corresponding personalized content.

Accordingly, the system as explained above provides a personalized descriptive file which contains at least one pointer to personalized content. This pointer may be in the form of the descriptive data 120 as explained in connection with FIG. 1 and may include an identifier relating to the personalized content, e.g. a hash value or a URI. According to some embodiments, the descriptive file may also contain a list of pointers to the personalized content, and the client 510 may choose from the items of this list.

Figure 3:
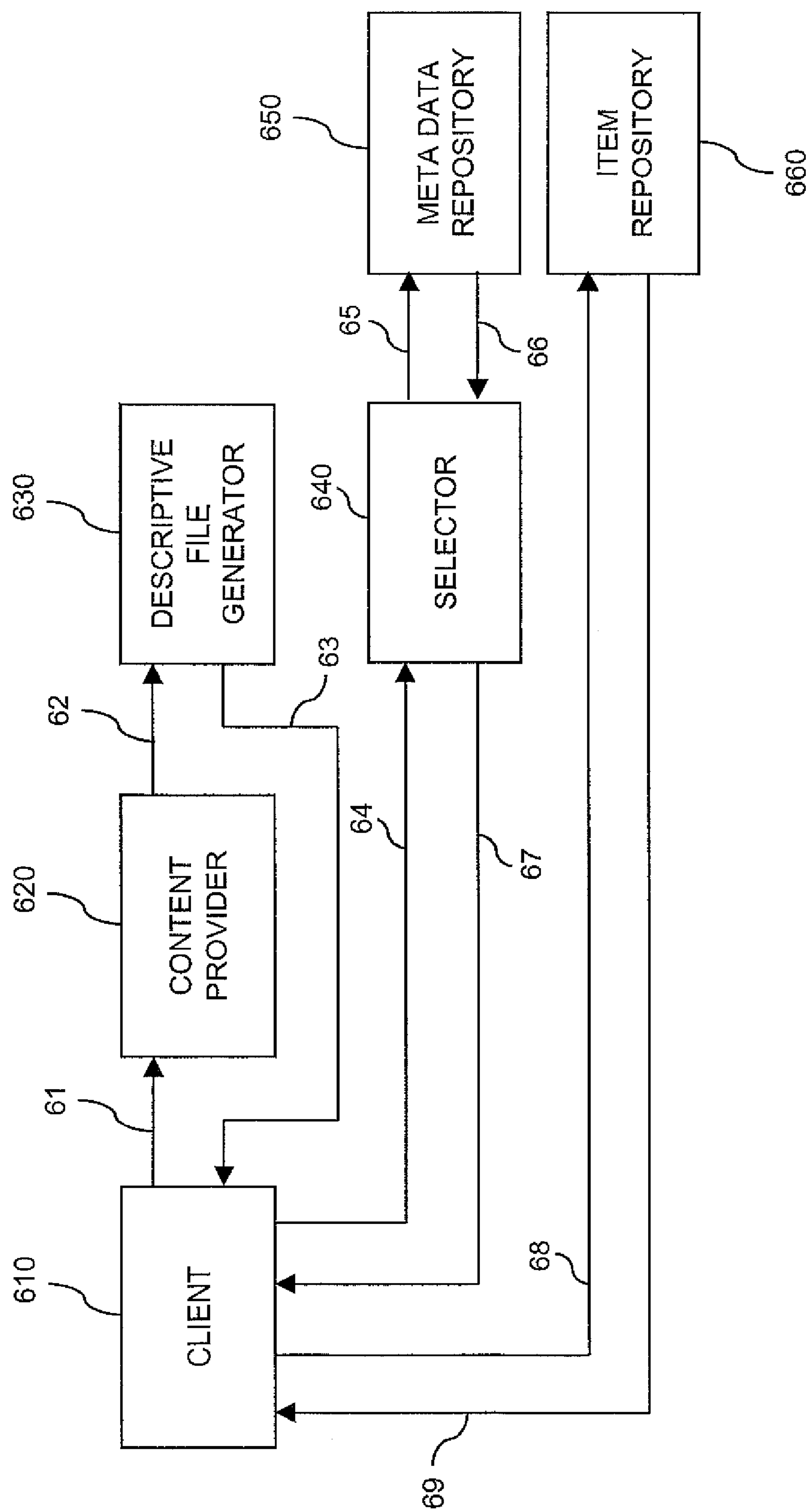
FIG. 3 shows a block diagram for schematically illustrating a further system for individualized communication of data according to an embodiment of the invention.

FIG. 3 shows a block diagram for schematically illustrating a system for individualized data communication according to a further embodiment of the invention. Again, the system may operate according to the concepts as explained in connection with FIG. 1 by using a descriptive file which includes at least one identifier of a placeholder type for communicating a data entity, e.g. the data entity 200, to different recipients. The components of the system of FIG. 3 are similar to those of FIG. 2. As illustrated, the system includes a client 610, a content provider 620, a descriptive file generator 630, a selector 640, a metadata repository 650, and an item repository 660. As compared to the system of FIG. 2, in which the descriptive file was personalized by including one or more pointers to the personalized content, the system of FIG. 3 is configured to operate on the basis of a generic descriptive file, which is similar for each recipient. This corresponds to the scenario described in connection with FIG. 1, in which the descriptive data 120 is provided separately from the descriptive file 100. According to one example, this generic descriptive file may be implemented by including into the descriptive file a reference to a location, e.g. a URL, where to get personalized content. Different types of the personalized content may then be provided to the client 610 on the basis of a category indicator provided by the client 610 when requesting the personalized content. According to a further example, the descriptive file may contain a location reference, e.g. a URL, where to get the personalized content, and the client may be identified by a suitable credential, e.g. its MAC address (MAC: Media Access Control) or a username, so as to be provided with a specific type of personalized content. Accordingly, a mapping between a specific recipient and the personalized content may be accomplished separately from the descriptive file, by information stored within the client 610, e.g. in the form of the category indicator, or at the location to which the location reference in the descriptive file refers, e.g. in the form of a mapping between the category indicator, MAC address, username or other credential to specific types of personalized content.

The operation of the system as illustrated in FIG. 3 is as follows. The client 610 requests the main content from the content provider 620 by sending a message 61 to the content provider 620. The content provider 620 triggers the descriptive file generator 630 by sending a message 62. The descriptive file generator 630 generates the descriptive file, which includes at least one identifier of the placeholder type for personalized content. Further, the descriptive file will also include one or more identifiers of the direct type which refer to the main content. The descriptive file generator 630 provides the descriptive file to the client 610 by sending a message 63.

On the basis of the descriptive file, the client 610 requests the main content and the personalized content. This may involve that, e.g. at a certain time as specified by the position of the identifier of the placeholder type, the client 610 requests the individualized data piece from the selector 640, by sending a message 64. By sending a message 65, the selector 640 requests a list of content items from the metadata repository 650. By sending a message 66, the metadata repository responds with a list of available content items. The selector 650 makes a selection from the list of available content items and responds to the client 610 with an identifier pointing to a location from where to retrieve personalized content, e.g. a URL pointing to personalized content at the item repository 660. By sending a message 68, a client 610 requests the personalized content, e.g. at the specified time. As explained above, this may include sending a category indicator or other credential, e.g. a MAC address, username or the like. In some embodiments, this may also include sending the identifier of the placeholder type. By sending a message 69, the item repository 660 responds with the personalized content.

It is to be noted that in the systems of FIGS. 2 and 3 at least the part of the metadata repository and/or item repository which provides the personalized content may be implemented by servers, e.g. operated by an advertisement agency or advertisement broker. Further, the metadata repository and/or the item repository may also be implemented by a P2P platform. The physical implementation of the metadata repository and/or item repository may be decided on the basis of requirements of the content provider. Further, it is to be understood that the identifiers of the personalized content may be included in the descriptive file, but may also be stored at a different location, e.g. within mapping data provided by the client, the selector, the metadata repository, and/or the item repository, or within an additional file which complements the descriptive file. Also, it is to be understood that different types of communication may be used between the different components of the system, including unicast communication, multicast communication, and broadcast communication. For example, the descriptive file generator could broadcast the descriptive file to multiple recipients or clients, and the main content and/or the personalized content could be provided by the item repository using broadcast transmission. However, in some cases such as with the individualized descriptive file as used in the system of FIG. 2, a unicast transmission of the descriptive file for the client may be more appropriate. Further, it is to be understood that at least some of the processes required for generating the descriptive file may also be carried out before the client requests the main content from the content provider.

Figure 4:
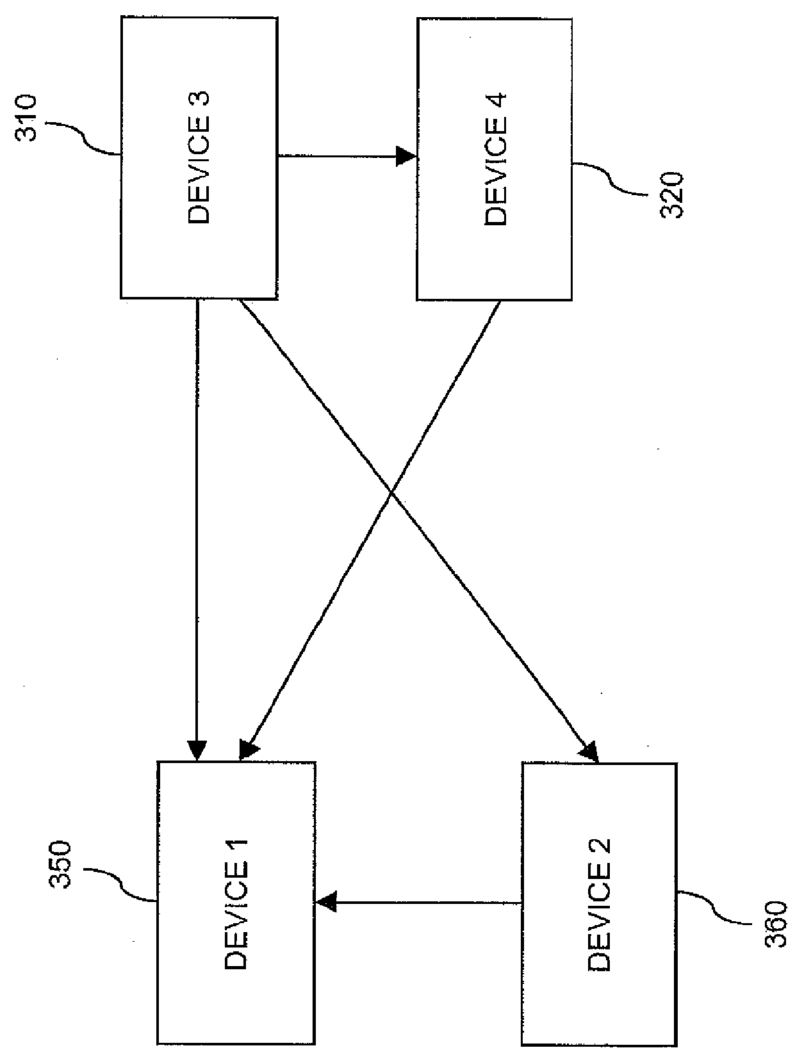
FIG. 4 schematically illustrates a network environment in which concepts according to embodiments of the present invention may be applied.

FIG. 4 schematically illustrates a communication network environment in which the above concepts may be applied. More specifically, FIG. 4 focuses on the above-mentioned aspect that the data pieces of the main content and/or the individualized data piece of the personalized content may be retrieved from different sources. Such a situation is typical when using a P2P protocol, such as the BitTorrent protocol, but may also occur with other protocols, i.e. with a streaming protocol in which different pieces of the stream may be provided from different sources.

In the network environment of FIG. 4, a number of devices 310, 320, 350, 360 are illustrated. For example, the devices 310 and 320 may be servers storing data pieces of the main content and/or individualized data pieces of the personalized content. For example, the devices 310 and 320 may implement the item repository as explained in connection with FIGS. 2 and 3. The devices 350 and 360 may be any type of recipient devices, e.g. terminals or the like. For example, the devices 350 and 360 may each implement a client as illustrated in FIGS. 2 and 3. The devices 350 and 360 may correspond to different recipients of personalized data. That is to say, the device 350 may receive a different type of the personalized data than the device 360.

From the perspective of the device 350, there exist different possibilities of obtaining a data piece of the main content. For example, the data piece may be retrieved from the device 310. In addition, the same data piece may have been provided from the device 310 to the device 320, e.g. in the course of P2P data communication, and the device 350 may obtain this data piece from the device 320. Further, the data piece may have been provided from the device 310 to the device 360, e.g. in the course of P2P data communication, and the device 350 may obtain this data piece from the device 360. Accordingly, the device 350 is provided with different options for obtaining the data piece of the main content. Selection between these different options may be carried out, e.g., on the basis of properties of a data connection to the device 310, 320, 360, e.g. on the basis of a latency and/or a bit rate of the data connection. In this way, the data piece may be obtained from the most suitable location and network resources may be used in a very efficient manner. For obtaining the individualized data piece, the situation is similar. However, in the assumed scenario that the devices 350 and 360 correspond to different recipients which are intended to receive the different types of the personalized data, the individualized data piece may not be available at the device 360.

Figure 5:
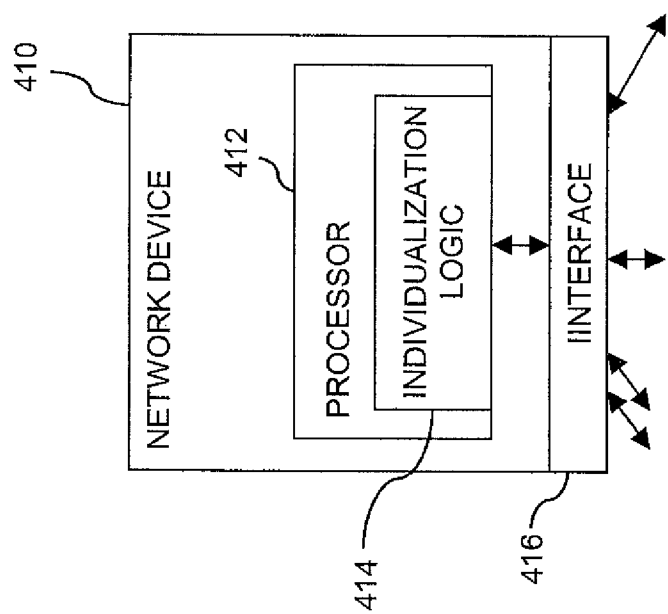
FIG. 5 schematically illustrates a network device according to an embodiment of the invention.

FIG. 5 schematically illustrates a network device 410 according to an embodiment of the invention. For example, the network device 410 may correspond to one of the devices 310 or 320 of FIG. 4. In the illustration of FIG. 5, only some components of the network device 410 are illustrated, which are considered to be helpful for understanding the concepts as described herein. It is to be understood that further components of the network device 410 may be provided, depending on the specific implementation of the network device 410.

As illustrated, the network device 410 includes a processor 412. The processor implements an individualization logic 414, e.g. by executing suitably designed program code. In addition, the network device 410 includes an interface 416 which is coupled to the processor 412 and to the individualization logic 414. The interface 416 may be of any known type which is suitable for communicating with other network devices and/or terminals. For example, the interface 416 may be an interface allowing communication according to an internet protocol. Further, it is to be understood that the interface 416 may be based on different physical implementations, e.g. may be configured to use a wired communication channel and/or a wireless communication channel.

The individualization logic 414 is configured to accomplish individualization according to the above-mentioned concepts. Accordingly, in some embodiments the individualization logic 414 may be part of a descriptive file generator and may accomplish insertion of the at least one identifier of the placeholder type into the descriptive file. In some embodiments, inserting the identifier of the placeholder type into the descriptive file may also be accomplished separately from generation of the descriptive file. For example, the network device 410 could receive a descriptive file via the interface 416, the individualization logic 414 could add the at least one identifier of the placeholder type to the received descriptive file. In addition, the individualization logic 414 may also accomplish inserting descriptive data associated with the identifier of the placeholder type into the descriptive file, e.g. the descriptive data 120 as explained in connection with FIG.

1. The descriptive file with the at least one identifier of the placeholder type and optionally also with the descriptive data associated with the identifier of the placeholder type may then be transmitted to another device using the interface 416.

According to other examples, the individualization logic 414 may be configured to accomplish a mapping between the identifier of the placeholder type and a specific type of the descriptive data associated with the identifier of the placeholder type. This may be accomplished by modifying the descriptive file, e.g. by including the descriptive data into the descriptive file, or by storing the descriptive data at a given location. For example, the individualization logic may configure a client in such a manner that it always retrieves a certain type of the individualized data piece upon encountering the identifier of the placeholder type in the descriptive file. Further, the individualization logic could configure mapping data which relate certain recipients to corresponding types of personalized content. Such mapping data could be stored, e.g., within the item repository as described in connection with FIGS. 2 and 3 or at any other suitable location. Moreover, the individualization logic 414 could also implement functions of the selector as explained in connection with FIGS. 2 and 3.

Figure 6:
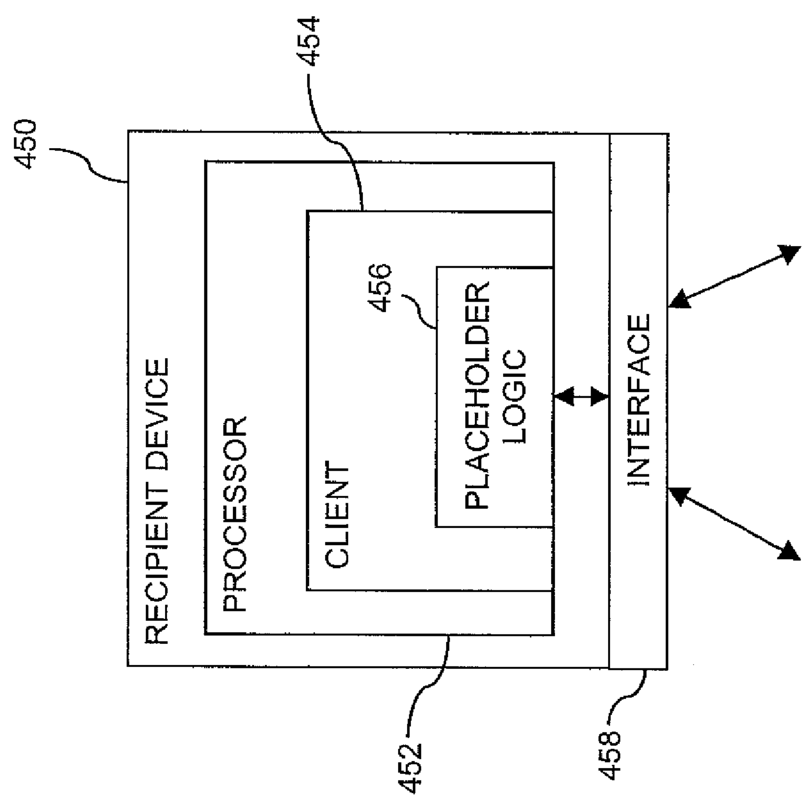
FIG. 6 schematically illustrates a recipient device according to an embodiment of the invention.

FIG. 6 schematically illustrates a recipient device 450 according to an embodiment of the invention. For example, the recipient device 450 may correspond to the device 350 or 360 of FIG. 4. For the sake of clarity, the recipient device 450 is illustrated with components which are considered to be helpful for understanding the concepts as described herein. However, it is to be understood that the recipient device 450 may comprise further components as well, depending on the specific implementation of the recipient device 450.

As illustrated, the recipient device 450 includes a processor 452 which implements a client 454 with a placeholder logic 456. The client 454 and the placeholder logic 456 may be implemented by suitably designed program code which is executed by the processor 452. The recipient device 450 further includes an interface 458 which is coupled to the processor 452, to the client 454 and to the placeholder logic 456. Using the interface 458, the recipient device 450 may communicate with other devices, e.g. servers or other recipient devices. Examples of such communication have been outlined in connection with FIG. 4. The interface 458 may be of any type which allows data communication with the other devices. For examples, the interface 458 may be configured to allow data communication according to an internet protocol. Further, it is to be understood that the interface 458 may be based on different physical implementations, e.g. may be configured to use a wired communication channel and/or a wireless communication channel.

The client 454 of the recipient device 450 may be configured to accomplish functions of the client as explained in connection with FIGS. 1 to 3. In particular, the client 454 may be configured to accomplish reception of data on the basis of the descriptive file. For this purpose, the client 454 is configured to analyze the identifiers in the descriptive file. If the identifier is of the direct type, the client may retrieve the corresponding data piece of the main content on the basis of the identifier of the direct type. The placeholder logic 456 is configured to determine whether an identifier is of the placeholder type. If an identifier in the descriptive file is of the placeholder type, the placeholder logic 456 retrieves the descriptive data associated with the identifier of the placeholder type. On the basis of this descriptive data, the personalized content is retrieved. For example, as explained in connection with FIG. 1, a specific type of the descriptive data 120 may be provided which refers to a specific type of the individualized data piece corresponding to the recipient.

Although the placeholder logic 456 was described above as being implemented within the client 454 of the recipient device 450, it is to be understood that in some embodiments at least a part of the placeholder logic 456 may be implemented within a network device, e.g. within the item repository as described in connection with FIGS. 2 and 3. In one example of such an implementation, the placeholder logic within the item repository could receive a request indicating that the content to be provided is related to a placeholder identifier, e.g. by including a corresponding indicator into the request. The placeholder logic within the item repository could then retrieve the descriptive data of the requested individualized content, retrieve the individualized content, and respond with the retrieved content. In some embodiments the placeholder logic within the item repository may also receive the identifier from the descriptive file together with a request for the respective content. The placeholder logic within the item repository could then determine whether the identifier is of the placeholder type and, if so, retrieve the descriptive data of the requested individualized content, retrieve the individualized content, and respond with the retrieved content.

Figure 7:
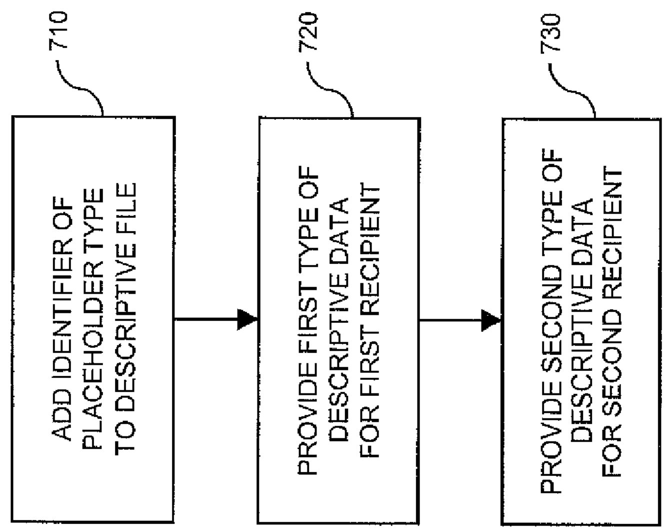
FIG. 7 shows a flow-chart for schematically illustrating a method according to an embodiment of the invention.

FIG. 7 shows a flow-chart for schematically illustrating a method of individualized data communication according to an embodiment of the invention. The method may implement the concepts as described above and may be performed using the above-described devices and components. In accordance with the concepts as described above, the method has the purpose of communicating a data entity to at least a first and a second recipient. This is accomplished on the basis of a descriptive file. The descriptive file may be the descriptive file as explained above, e.g. the descriptive file 100 illustrated in FIG. 1. The descriptive file may be generated by a descriptive file generator, e.g. by the descriptive file generator as illustrated in FIGS. 2 and 3. The descriptive file includes at least one identifier of a direct type, which is associated with a corresponding data piece of the data entity. In particular, there may be a one-to-one relation between the identifier of the direct type and the corresponding data piece. The identifier of the direct type may be a signature, e.g. a hash value, or may be a delivery source identifier, e.g. a URI.

At step 710, an identifier of a placeholder type is added to the descriptive file. This may be accomplished during generation of the descriptive file, e.g. by the descriptive file generator as described in connection with FIGS. 2 and 3. However, it is also possible that an already existing descriptive file is supplemented with the identifier of the placeholder type, which may be accomplished by a dedicated individualization components receiving the descriptive file with the identifiers of the direct type as input. According to an embodiment, the identifier of the placeholder type has the same format as the identifier of the direct type. For example, if the identifier of the direct type is a signature, the identifier of the placeholder type may be a dummy signature. Further, if the identifier of the direct type is a delivery source identifier, e.g. a URI, the identifier of the placeholder type may be a dummy delivery source identifier, e.g. a dummy URI. The identifier of the placeholder type is associated with descriptive data of an individualized data piece. The descriptive data may have different types, depending on the recipient to which the data entity is communicated. Accordingly, there is typically no one-to-one relation of the identifier of the placeholder type to a specific content or type of the individualized data piece.

At step 720, a first type of the descriptive data is provided for the first recipient. At step 730, a second type of the descriptive data is provided for the second recipient. By providing different types of the descriptive data for the first and the second recipient, the descriptive data may refer to different types or content of individualized data piece, which depends on the intended recipient.

Steps 710, 720 and 730 may all be performed by an individualization logic of the descriptive file generator. However, it is also possible that steps 720 and 730 are performed by an individualization logic which is provided separately from the descriptive file generator, or may even be performed manually, e.g. by a network operator. This may be accomplished by storing the descriptive data associated with the identifier of the placeholder type at a predefined location, i.e. within the descriptive file or separately from the descriptive file. Further, this may be accomplished by controlling a mapping of the recipients to different types of the individualized data piece.

Accordingly, different steps of the method of FIG. 7 may be implemented in different devices. For example, an implementation of the method within the descriptive file generator may include step 710, but not step 720 and 730. Further, an implementation of the method separately from the descriptive file generator may include steps 720 and 730, but not step 710.

Figure 8:
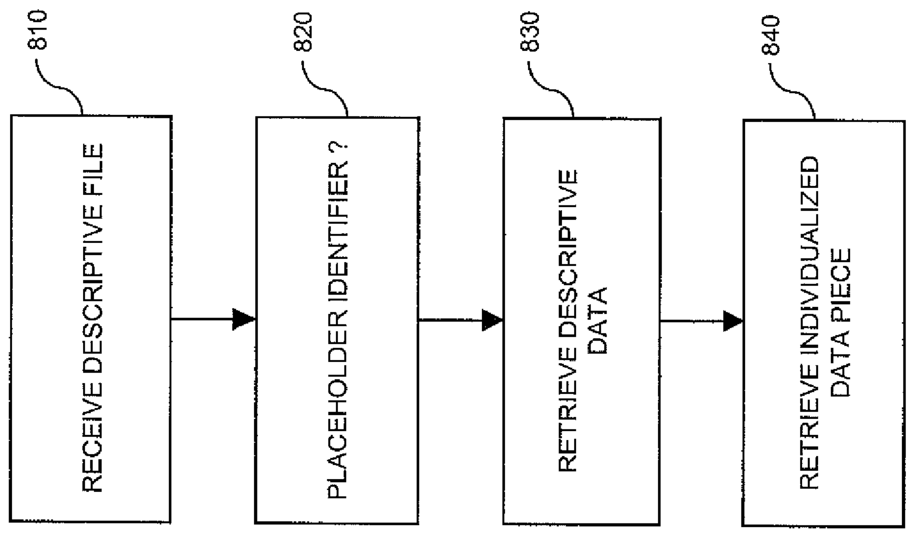
FIG. 8 shows a flow-chart for schematically illustrating a further method according to an embodiment of the invention.

FIG. 8 shows a flow-chart for schematically illustrating a further method according to an embodiment of the invention. The method of FIG. 8 has the purpose of receiving data on the basis of a descriptive file. Again, the method may implement the concepts of individualization as explained above. At least a part of the method may be carried out in a recipient device as explained above, i.e. the recipient device 450 as explained in connection with FIG. 6.

At step 810, a descriptive file of a data entity is received. The descriptive file includes at least one identifier. The identifier may be either of a direct type associated with a corresponding data piece of the data entity, or of a placeholder type associated with descriptive data of an individualized data piece. The descriptive file, a identifier of the direct type, and the identifier of the placeholder type may correspond to those as explained above, e.g. may be the descriptive file 100 and the identifiers as explained in connection with FIG. 1. The identifier of the direct type may be a signature, e.g. a hash value, or may be a delivery source identifier, e.g. a URI. The identifier of the placeholder type may have the same format, e.g. may be a dummy signature or a dummy delivery source identifier. The descriptive file may be received directly from a descriptive file generator or may be received via intermediate elements, e.g. via an individualization logic which adds the identifier of the placeholder type to the descriptive file and/or adds the descriptive data associated with the identifier of the placeholder type to the descriptive file.

At step 820, it is determined whether the identifier is of the placeholder type. If the descriptive file includes multiple identifiers, then the determination may be carried out for each of the identifiers.

At step 830, if the identifier is of the placeholder type, the descriptive data associated with the identifier of the placeholder type is retrieved. As explained in connection with FIG. 1, the descriptive data may include an identifier of a specific type of the individualized data piece corresponding to the recipient. For example, the descriptive data may include a signature of the specific type of the individualization data piece or a delivery source identifier of the specific type of the individualized data piece. The descriptive data may be retrieved from a predefined location within the descriptive file. Further, the descriptive data may be retrieved from a location which is separate from the descriptive file, e.g. from an additional file which complements the descriptive file or from any other suitable storage location, e.g. from a certain network location identified by a URL.

At step 840, the individualized data piece is retrieved on the basis of the descriptive data. This may involve receiving the individualized data piece and verifying the individualized data piece on the basis of a signature in the descriptive data. Further, this may involve requesting the individualized data piece using a delivery source identifier included in the descriptive data.

The method of FIG. 8 may be performed by a placeholder logic of a client in a recipient device, e.g. the client as explained in connection with FIG. 2, 3, or 5. However, it is to be understood that some portions of the method may be carried out by a placeholder logic in a network device, e.g. in the item repository as explained in connection with FIGS. 2 and 3. For example, in some embodiments at least a part of steps 820, 830 and 840 may be carried out by such a network based placeholder logic.

FIGS. 9A and 9B show examples of descriptive files which may be used in data communication according to the Bit Torrent protocol, i.e. examples of torrent files.

According to the BitTorrent protocol, there are two main levels where the integrity of the transmitted content is checked.

The first one is dedicated to the integrity of the descriptive file. It includes verifying the main part of the descriptive file, which contains, among other details, the regular length of a data piece, the hashes of the pieces, their number, the size (s) of the file (f) to rebuild, their name (s) and directory structure, or the like.

Whereas the main part of the descriptive file includes information about what is to be received, other parts of the descriptive file may include information how it is to be received or downloaded, e.g. by providing one or more tracker URLs, tracker protocols, information on who created the descriptive file, when it was generated, a human-readable common of an author, or the like.

According to the BitTorrent protocol, the footprint, i.e. SHA1 hash value, of the main part of the descriptive file constitutes the signature of the descriptive file. This signature is used for verifying the integrity of the descriptive file.

A further integrity check happens when a data piece is acquired: a SHA1 hash value of the received data piece is computed and compared to the one which was supposed to be received according to the main part of the descriptive file.

The concepts of individualization as explained in connection with FIGS. 1 to 8 allow for leaving the main part of the descriptive file unchanged, while still being able to communicate individualized content to different recipients.

It should be noted that the following description relating to an implementation of the concepts on the basis of the BitTorrent protocol are based on the single file mode of the BitTorrent protocol. However, it is to be understood that the concepts may be applied to the multi-file mode of the BitTorrent protocol as well.

In FIGS. 9A and 9B, the main part of a torrent file is schematically illustrated. The main part is located in the info section of the route dictionary and includes fields designated as “length”, “name”, “piece length”, and “pieces”. The field “length” defines the length of the file to be communicated in bytes. The field “name” defines the suggested name of the file. The field “piece length” defines the piece length in bytes. The field “pieces” includes a string consisting of a concatenation of 20-byte SHA1 hash values. One hash value is provided for each piece of the file. The field “pieces” therefore includes a byte string.

The example of FIGS. 9A and 9B assumes that the file has a length of “XXXXX,”e.g., 11264 bytes, that the name of the file is “YYYYY,” and that the piece length is “ZZZZ,”e.g., 1024. Further, it is assumed that there are ten pieces of main content, designated P1, P2, . . . , P10, which have corresponding hash values SHA1(P1), SHA1(P2), . . . , SHA1(P10). Further, the descriptive files of FIGS. 9A and 9B include, in the field "pieces," a hash value SHA1(B) or SHA1(G) associated with an individualized piece B or G, respectively. For example, if the file corresponds to a movie, this individualized piece may correspond to an advertisement. For the sake of clarity, it is assumed that the advertisement is provided in one piece. However, an advertisement could also be provided in two or more pieces. The hash value of the individualized piece is inserted between the other hash values. Further, the example of FIGS. 9A and 9B assumes that the individualized piece, e.g., advertisement, is different for each targeted group. For example, the piece B may be targeted to young boys, and the piece G may be targeted to young girls. Accordingly, the file as illustrated in FIG. 9A would pertain to the targeted group of young boys, whereas the descriptive file of FIG. 9B would pertain to the targeted group of young girls.

As explained above, according to the BitTorrent Protocol, the entries in the main part of the descriptive file, i.e. in the section of "info" forms the basis of the signature of the descriptive file, also referred to as "infohash". Accordingly, the signature depends only on the fields as illustrated in FIGS. 9A and 9B.

However, as can be seen from FIGS. 9A and 9B, the infohash will be different for the two descriptive files of FIGS. 9A and 9B. Accordingly, in the BitTorrent protocol, these descriptive files will be seen as referring to completely different content. No peer offering the "boys' version" of the movie could contribute to the "girls' version".

FIG. 10 shows an example of a descriptive file in accordance with the concepts as explained herein. As can be seen, the section "info" is generally similar to that of the descriptive files of 9A and 9B. However, in the field "pieces", there is no hash value of the individualized data piece, i.e. of the piece "B" or of the piece "G", but only a placeholder, designated as PH. Accordingly, the part of the descriptive file which varies between FIGS. 9A and 9B, which may also be referred to as dynamic part, is replaced by the placeholder which may act as a symbolic link common to all targeted groups.

The placeholder PH, which is one example of the above-mentioned identifier of the placeholder type, has the same length as the other piece signatures, e.g. 20 bytes according to the BitTorrent protocol. The placeholder PH may be settled once, e.g. defined in a standard. For example, a potential placeholder could be the SHA1 hash value of "ericsson ads 2P2 solution" which is [4d622cad7ba532e8defe3d60e2bf75a2e2f369c]. Typically, the placeholder PH would be determined in such way that confusion with the signatures of the pieces is avoided. Since the placeholder PH is not a hash value computed from a specific data content, it may also be referred to as a fake signature or dummy signature.

Accordingly, when a client wants to fetch a piece on the basis of the placeholder PH, it knows that the placeholder PH should not be used to verify the integrity of the piece, that the piece is not part of the main content and any information about this piece should be checked elsewhere, e.g. on the basis of an extension in the torrent file itself or from a special host or peer, and that the piece is available within a smaller group and, normally, cannot be fetched from all peers.

Figure 11:
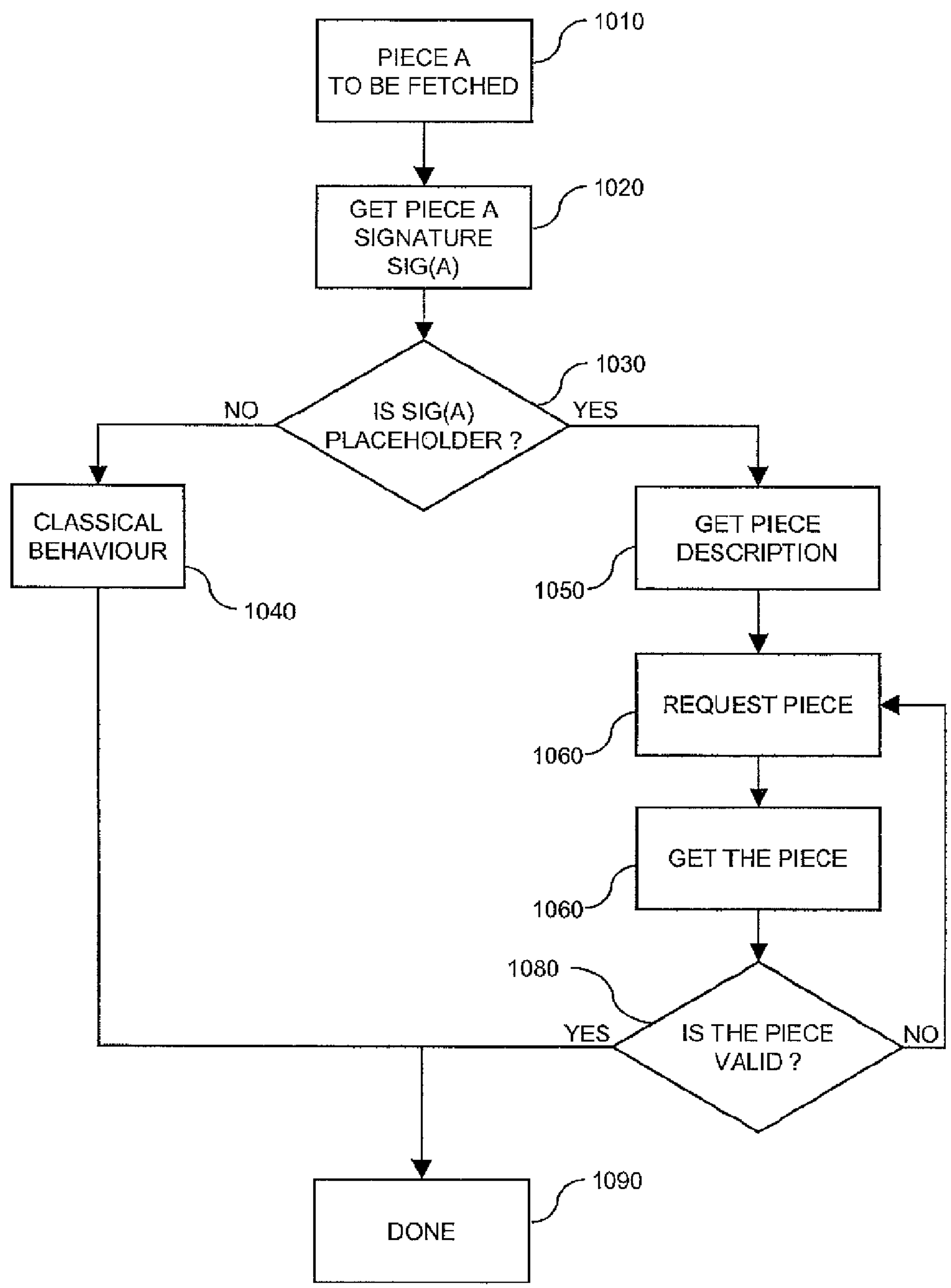
FIG. 11 shows a flow-chart for schematically illustrating a process according to an embodiment of the invention.

An example of a process to be implemented by the client is schematically illustrated by the flow-chart of FIG. 11.

At step 1010, the client determines that piece A is to be fetched.

At step 1020, the client gets the signature of piece A, designated as SIG(A).

At step 1030, it is determined whether the signature of piece A is a placeholder. If this is not the case, the process continues with step 1040 in which the piece corresponding to the signature is retrieved in a conventional manner, which corresponds to the classical behaviour according to the BitTorrent protocol.

If, at step 1030, it is determined that the signature of piece A is a placeholder, the process continues with step 1050. At step 1050, the client gets the description, i.e. the descriptive data, of the piece, which can be included in the descriptive file, e.g. in any extension outside the main part. In addition, or as an alternative, the description of the dynamic pieces can also be stored in another host and be accessed remotely.

At step 1060, the piece is requested and received at step 1060. At step 1080, it is determined where the piece is valid, which may be accomplished on the basis of a signature in the piece description obtained at step 1050. Here, it should be noted that step 1080 is optional. For example, if there is a full trust in the host that sends the piece, then integrity control may be omitted. For example, such a solution could be adopted if the piece corresponds to an advertisement provided directly by an advertisement agency, without any sharing between peers.

The process ends at step 1090.

Step 1060, in which the piece is requested, can be implemented in different ways. In the following, three options will be discussed. However, it is to be understood that these options are only examples and do not cover all possibilities of requesting the piece.

According to a first option, the user verifies the integrity of the piece and, if the piece is not valid, it is fetched from another peer or user. This solution provides a low complexity of implementation at the client side and at the BitTorrent tracker.

A second option is based on group identification (ID) exchange. For example, each user or peer may send its group ID either in a classical message or in a new type of message. In this way, a peer may know a group of other peers which are intended to receive the same type of personalized content. Accordingly, when a user needs to fetch personalized content, e.g. an advertisement, only the peers of his group may be used as sources to retrieve the personalized content.

According to a third option, the tracker, which is a host which provides the peers with whom pieces are to be shared, knows the group ID of the peers. When a user requests a set of peers, the tracker provides him with a certain proportion of peers within his own group. These peers can have a special flag, and the user can use this special flag in order to find the peers. As an alternative, the user could find the peers of his group on the basis of a trial and error scheme, which may be similar to that as described in the above-mentioned first option.

Figure 12:
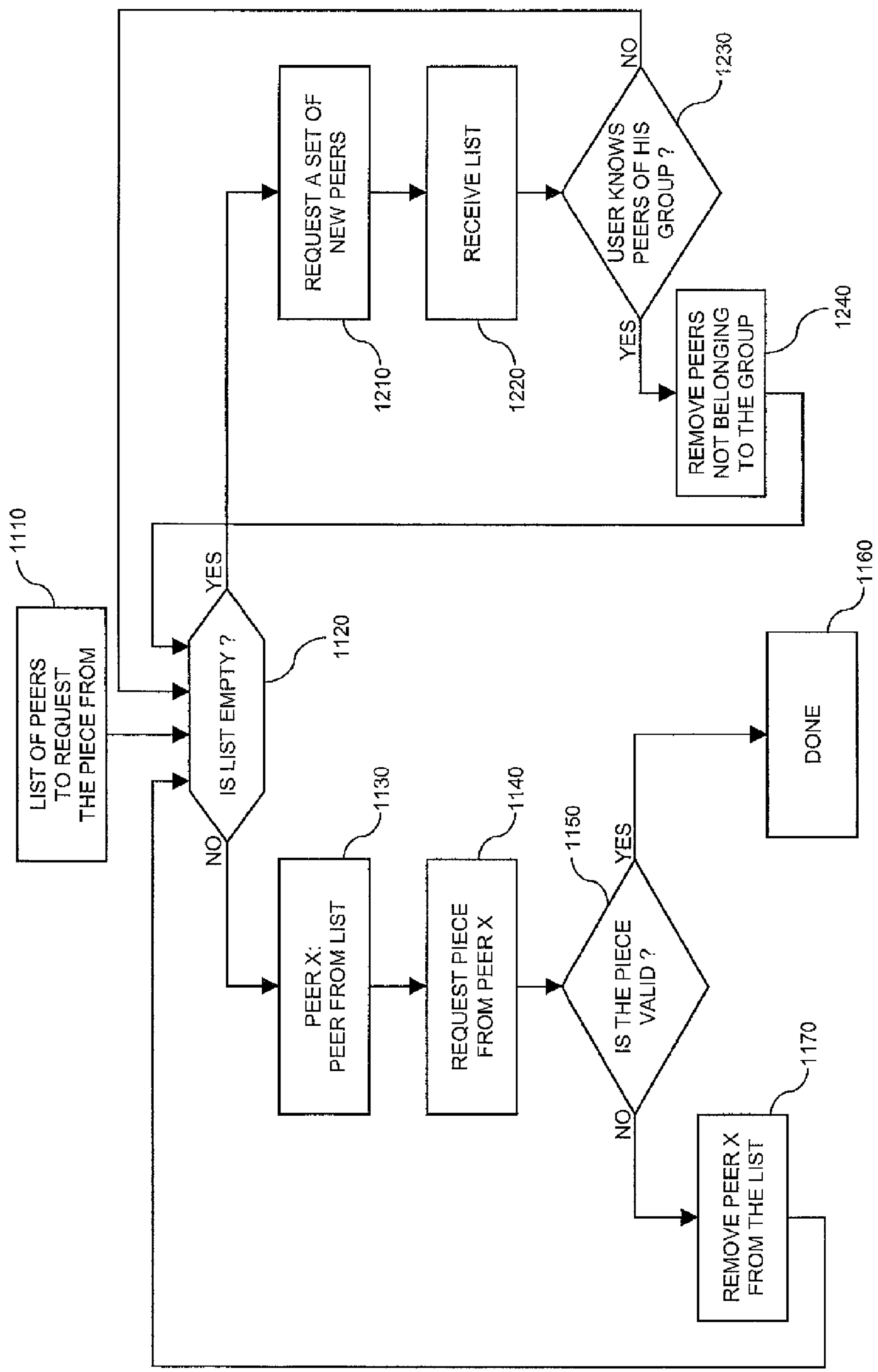
FIG. 12 shows a flow-chart for schematically illustrating a further process according to an embodiment of the invention.

FIG. 12 shows a flow-chart for schematically illustrating a process for achieving peer and piece management according to an embodiment of the invention.

At step 1110, a list of peers is obtained. The list of peers contains peers from which the individualized piece may be requested. For example, the client may obtain the list of peers from a tracker according to the BitTorrent protocol.

At step 1120, it is checked whether the list is empty. If the list is not empty, the process continues with step 1130. If the list is empty, the method continues with step 1210.

At step 1130, a peer from the list is selected, designated as "peer X".

At step 1140, the piece is requested from the selected peer. If the piece has been received from the selected peer, at step 1150, it is checked whether the piece is valid. If this is not the case, the selected peer is removed from the list at step 1170. If the piece is determined to be valid at step 1150, the process may end at step 1160.

After having removed the selected peer from the list at step 1170, the process continues by repeating step 1120 so as to determine whether the list is empty.

Having determined that the list is empty at step 1120, a set of new peers is requested at step 1210.

At step 1220, a list with the set of new peers is received.

At step 1230, it is checked whether the user knows the peers that belong to his own group, i.e. which is intended to receive the same type of personalized content. If this is not the case, the method returns to step 1120.

If it is determined that the user knows the peers belonging to the group, the method continues with step 1240 in which peers not belonging to the group are removed from the list. Having removed the peers not belonging to the group from the list, the method returns to step 1120.

As can be seen, the process as illustrated in FIG. 12, which may be used as a part of the process of FIG. 11 so as to retrieve the individualized data piece, allows for efficiently managing a group of peers from which it is attempted to retrieve the individualized data piece.

In the above, concepts have been described which allow for individualized communication of a data entity to different recipients, e.g. including different advertisements for different people or groups of people into multimedia content or different advertisements at different points of time, without effecting the distribution of the main content, which may be shared and stored only ones. For example, this may be used for providing an alternative to the “BitTorrent Entertainment Network” where users have to pay per movie, by using individualized advertisements rather than payment from the user. Further, the concepts may be used to provide an alternative way of data communication to be used by distribution services, e.g. Hulu, by using P2P type data communication rather than pure streaming. Moreover, the concepts also allow for efficient individualization of streaming-based data communication. In particular, personalization may be achieved without changing the descriptive file, which allows for transmitting the descriptive file on a multicast or broadcast channel. Moreover, in some scenarios, the concepts as described above may also help in obtaining a better control over the use of the content by the recipient. For example, the BitTorrent protocol or another P2P protocol may be used to deliver a multimedia file with advertisements in one monolithic block, which makes it harder to temper with this content, e.g. to skip the advertisements, than in a solution in which a playlist points to separate files for the content and advertisement pieces. Further, the concepts provide a possibility to commercialize P2P networks by means of targeted advertising.

It is to be understood that the above explanations are intended to provide a better understanding of the concepts and are susceptible to various modifications. For example, the concepts may be used in connection with different types of communication protocols, in addition to the above-mentioned examples of the BitTorrent protocol and the HTTP Live Streaming protocol. Further, the concepts may be applied for various purposes. For example, in addition to distributing multimedia content, the concepts may be applied to distribute software in an individualized manner.

The identifier of the placeholder type may be used as a general reference to various types of individualized content, and sometimes also as a reference to pieces of the main content. Further, the identifier of the placeholder type may be used as a reference to a piece of content which is the same for all intended recipients, but otherwise differs from the pieces of the main content. For example, in a BitTorrent scenario in which the pieces of the main content have the same characteristics, e.g size, the identifier of the placeholder type may be used to refer to a piece having different characteristics. One example of such a usage would be to use the identifier of the placeholder type as a reference to a further torrent file. In this or other examples of using the identifier of the placeholder type as a reference to one or more pieces which are common to all recipients but different from the “classical” pieces, the descriptive data concerning these pieces could be placed in the info section of the torrent file, which improves robustness.

Also, the concepts may be applied within various types of communication networks, including mobile communication networks, wired communication networks, internet based communication networks, or intranet based communication networks. Further, various possibilities exist for implementing the functions of the devices and components described herein. For example, these functions may, at the least part, be implemented by software to be executed by processor or by dedicated hardware.

The invention claimed is:

1. A method of communicating a data entity to at least a first recipient and a second recipient on the basis of a descriptive file, the method comprising:

providing the descriptive file to the first recipient and the second recipient, the descriptive file comprising:

a direct identifier corresponding to a common data piece common to all versions of the data entity;

a placeholder identifier corresponding to an individualized data piece not common to all versions of the data entity, the placeholder identifier comprising a predefined string of characters that is independent of all versions of the data entity;

providing, separately from the descriptive file, a first descriptive data to the first recipient, the first descriptive data:

excluding any reference to the common data piece;

referring to a first individualized data piece that is useful for completing a first version of the data entity by being combined with at least the common data piece;

providing, separately from the descriptive file, a second descriptive data to the second recipient, the second descriptive data:

being distinct from the first descriptive data;

excluding any reference to the common data piece;

referring to a second individualized data piece that is useful for completing a second version of the data entity by being combined with at least the common data piece, the second individualized data piece being distinct from the first individualized data piece;

providing the first and second individualized data pieces to the first and second recipients, respectively.

2. The method of claim 1, further comprising providing a third descriptive data in the descriptive file.

3. The method of claim 1, wherein at least one of the first descriptive data and the second descriptive data is associated with the placeholder identifier by being stored at a predefined location.

4. The method of claim 1:

wherein the direct identifier comprises a signature of the common data piece;

wherein at least one of the first descriptive data and the second descriptive data comprise a signature of the corresponding individualized data piece;

wherein the predefined string of characters is equal in length to each of the signature of the common data piece and the signature of the first individualized data piece.

5. The method of claim 4, wherein the descriptive file is a torrent file according to a BitTorrent protocol.

6. The method of claim 1:

wherein the direct identifier comprises a delivery source identifier of the common data piece;

wherein the predefined string of characters is a dummy delivery source identifier;

wherein at least one of the first descriptive data and the second descriptive data comprise a delivery source identifier of the corresponding individualized data piece.

7. The method of claim 6, wherein the descriptive file is a playlist file according to a HTTP Live Streaming protocol.

8. The method of claim 1, further comprising adding the placeholder identifier to the descriptive file.

9. A method of receiving a data entity on the basis of a descriptive file, the method comprising: receiving, by a recipient, the descriptive file comprising:

a direct identifier corresponding to a common data piece common to all versions of the data entity;

a placeholder identifier corresponding to an individualized data piece not common to all versions of the data entity, the placeholder identifier comprising a predefined string of characters that is independent of all versions of the data entity;

in response to receiving the descriptive file and determining that the placeholder identifier is within:

retrieving, separately from the descriptive file, descriptive data that refers to a first individualized data piece that is useful for completing a first version of the data entity by being combined with at least the common data piece;

retrieving the first individualized data piece.

10. The method of claim 9, further comprising, in response to receiving the descriptive file and determining that the direct identifier is within, retrieving the common data piece on the basis of the direct identifier.

11. The method of claim 10:

wherein the direct identifier comprises a signature of the common data piece;

wherein the descriptive data comprises a signature of the first individualized data piece;

wherein the predefined string of characters is equal in length to each of the signature of the common data piece and the signature of the first individualized data piece.

12. The method of claim 11, wherein the descriptive file is a torrent file according to a BitTorrent protocol.

13. The method of claim 10:

wherein the direct identifier comprises a delivery source identifier of the common data piece;

wherein the predefined string of characters is a dummy delivery source identifier;

wherein the descriptive data comprises a delivery source identifier of the first individualized data piece.

14. The method of claim 9, wherein the descriptive file is a playlist file according to a HTTP Live Streaming protocol.

15. The method of claim 11, further comprising:

recognizing the predefined string of characters as a dummy signature;

verifying the integrity of the data entity using fewer than all of the received signatures, such that the dummy signature is not used in the verifying.

16. A device comprising:

one or more processing circuits implementing individualization logic for communicating a data entity to at least a first recipient and a second recipient on the basis of a descriptive file, the one or more processing circuits configured to:

provide the descriptive file to the first recipient and the second recipient, the descriptive file comprising:

a direct identifier corresponding to a common data piece common to all versions of the data entity;

a placeholder identifier corresponding to an individualized data piece not common to all versions of the data entity, the placeholder identifier comprising a predefined string of characters that is independent of all versions of the data entity;

provide, separately from the descriptive file, a first descriptive data to the first recipient, the first descriptive data:

excluding any reference to the common data piece;

referring to a first individualized data piece that is useful for completing a first version of the data entity by being combined with at least the common data piece;

provide, separately from the descriptive file, a second descriptive data to the second recipient, the second descriptive data:

being distinct from the first descriptive data;

excluding any reference to the common data piece;

referring to a second individualized data piece that is useful for completing a second version of the data entity by being combined with at least the common data piece, the second individualized data piece being distinct from the first individualized data piece;

provide the first and second individualized data pieces to the first and second recipients, respectively.

17. The device of claim 16, wherein the one or more processing circuits are further configured to generate the descriptive file.

18. The method of claim 16, wherein the one or more processing circuits are further configured to add the placeholder identifier to the descriptive file.

19. A device, comprising:

one or more processing circuits implementing placeholder logic for receiving a data entity on the basis of a descriptive file, wherein the one or more processing circuits are configured to:

receive the descriptive file comprising:

a direct identifier corresponding to a common data piece common to all versions of the data entity;

a placeholder identifier corresponding to an individualized data piece not common to all versions of the data entity, the placeholder identifier comprising a predefined string of characters that is independent of all versions of the data entity;

in response to receiving the descriptive file and determining that the placeholder identifier is within:

retrieve, separately from the descriptive file, descriptive data that refers to a first individualized data piece that is useful for completing a first version of the data entity by being combined with at least the common data piece; and retrieve the first individualized data piece.

20. The device of claim 19:

wherein the direct identifier comprises a signature of the common data piece;

wherein the descriptive data comprises a signature of the first individualized data piece;

wherein the one or more processing circuits are further configured to:

recognize the predefined string of characters as a dummy signature;

verify the integrity of the data entity using fewer than all of the received signatures, such that the dummy signature is not used in the verifying.

* * * * *